IMAGE REPRODUCING SYSTEM FOR A COLOR TELEVISION RECEIVER

Filed Feb. 18, 1965

6 Sheets-Sheet 1

INVENTORS
YASUMASA SUGIHARA AND
AKIRA HORAGUCHI
By Linton and Linton
ATTORNEYS

IMAGE REPRODUCING SYSTEM FOR A COLOR TELEVISION RECEIVER

Filed Feb. 18, 1965

INVENTORS
YASUMASA SUGIHARA AND
AKIRA HORAGUCHI
By Linton and Linton
ATTORNEYS

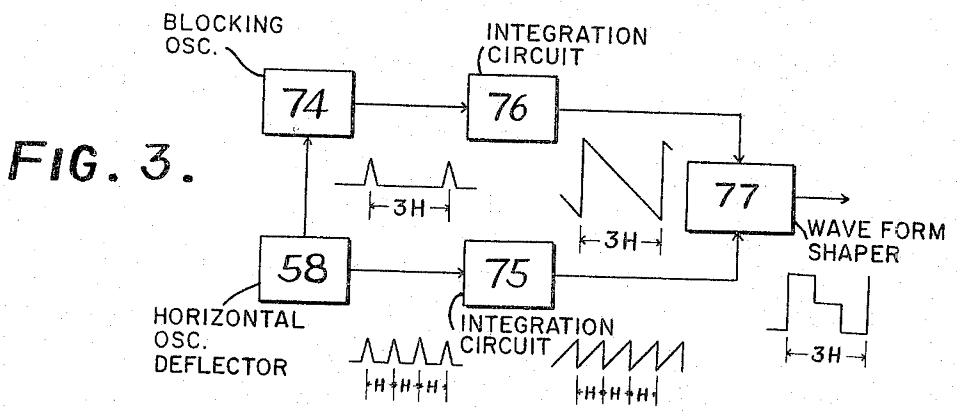
FIG. 3.
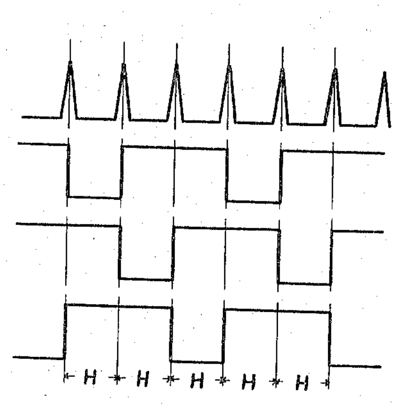
FIG. 4.a, FIG. 4.b, FIG. 4.c, FIG. 4.d
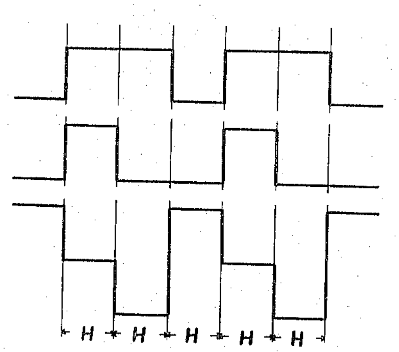
FIG. 5.a, FIG. 5.b, FIG. 5.c
INVENTORS
YASUMASA SUGIHARA
AND AKIRA HORAGUCHI
By Linton and Linton
ATTORNEYS FIG. 6.
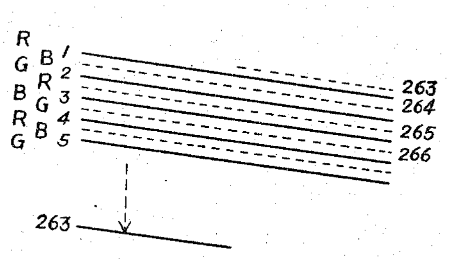
FIG. 8.
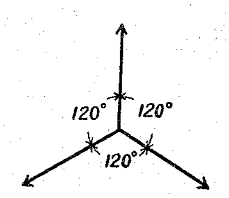
FIG. 7. a
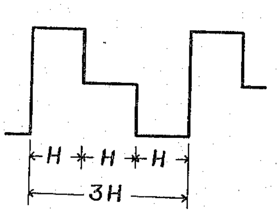
FIG. 9.
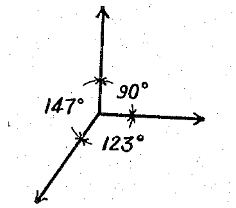
FIG. 7. b
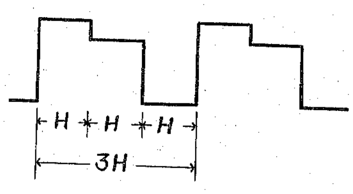
INVENTORS
YASUMASA SUGIHARA AND
AKIRA HORAGUCHI
By Linton and Linton
ATTORNEYS FIG. 10.
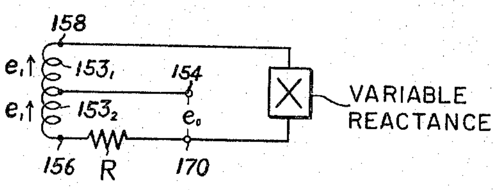
FIG. 11. a
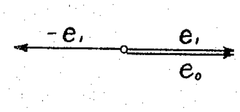
FIG. 11. b
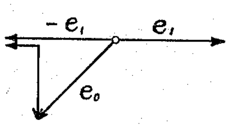
FIG. 11. C
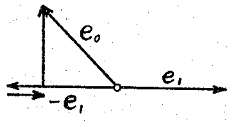
FIG. 12.
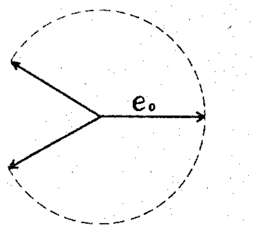
FIG. 13.
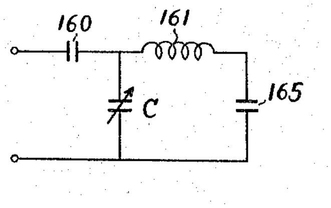
INVENTORS
YASUMASA SUGIHARA AND
AKIRA HORAGUCHI
By Linton and Linton
ATTORNEYS INVENTORS
YASUMASA SUGIHARA AND
AKIRA HORAGUCHI
By Linton and Linton
ATTORNEYS

1

3,316,346

IMAGE REPRODUCING SYSTEM FOR A COLOR TELEVISION RECEIVER

Yasumasa Sugihara, 945 Yukigaya, Ota-ku, Tokyo, Japan, and Akira Horaguchi, 2–757 Kosugi Jinya-cho, Kawasaki-shi, Japan Filed Feb. 18, 1965, Ser. No. 433,582

Claims priority, application Japan, May 5, 1964, 39/25,223

7 Claims. (Cl. 178—5.4)

This invention relates to improvements in and relating to image reproducing systems for color television receivers and has particular reference to such reproducing systems in a color television receiver equipped with a picture tube having a single electron gun, the electron beam emitted therefrom being controlled by the video signal information comprising a luminance signal and a chrominance signal which is commonly known as "NTSC signal."

More specifically, the present invention is directed to such image reproducing systems useful in a compatible color television receiver capable of reproducing both color and monochrome images without substantial modifications of existing black-and-white television receivers.

Before going into detailed elucidation of the present invention, a briew account will be given of the basic concept of the so-called NTSC compatible system with which the invention is primarily concerned.

What may be termed a "color sensation" can be defined by three fundamental properties, brightness, hue and saturation. To successfully effect the transmission of a color television image, therefore, it is necessary to provide signals proportional to the above three fundamental properties constituting a hue of the image. These color signals are in certain proportion to three primary colors, i.e., red, green and blue. Attempt to transmit these signals simultaneous will necessarily involve extravagant bandwidth, and hence, such attempt is not acceptable for the intended compatibility of a color television receiver.

To meet with the requirements of a color television receiver being compatible, the National Television System Committee developed a system whereby two substantially simultaneous signals are provided, one of which is primarily representative of the brightness and the other of which is representative of the chromaticity of the image, the latter signal being in the band width of the former signal. The brightness signal output according to the NTSC system is obtained from the red, green and blue camera outputs by combining same each with the three color components in ratios of 30% of red, 59% of green and 11% of blue, respectively. In order to transmit chromatic information of a scene being televised, the red, green and blue camera outputs are synthesized to form two chominance signals which are representative of the hue and saturation details of the picture.

The two chrominance signals are on two subcarriers identical in frequency but different 90 degrees in phase with respect to each other. The subcarrier amplitudes as combined are utilized to represent the saturation while the phase variations thereof are utilized to represent the hue information of the picture. Thus, the information representative of a televised scene as a whole is utilized

2 to develop two substantially simultaneous signals on the receiver, one of which being representative of the brightness and the other being representative of the chromaticity of the image. The latter signal as already stated is a subcarrier wave signal the frequency of which is within the band width of the brightness signal. This subcarrier wave signal has successive cycles each modulated in phase by signal components representative of the primary colors so that the cycles have substantially the same phase-hue characteristic. In such subcarrier wave signal the successive cycles are also modulated in amplitude by signal components representative of the color saturation of successive elemental areas of the televised color image. What is now commonly termed as a "composite video-frequency signal" comprising the brightness signal and the modulated subcarrier wave signal has been developed by the National Television System Committee (NTSC) for the tranlation of information representative of the hue of the televised image and will be referred to hereinafter as the NTSC signal.

The above-described NTSC signal is utlized to modulate a conventional radio-frequency carrier wave signal.

A receiver in such system intercepts the radio-frequency signal and derives the NTSC signal therefrom. One type of such receiver includes a pair of principal channels for applying the brightness and chrominance information to an image-reproducing device therein. The channel for translating the brightness signal is substantially the same as the video-frequency amplifier portion of a conventional monochrome receiver. The chrominance signal is translated through the second of such channels and three color-signal components individually representative of the three primary hues or colors red, green and blue of the image are derived therefrom and are combined with the brightness signal in the image-producing device to effect reproduction of the televised image. This close inter-relation between the chrominance signal and the luminance signal permits the image to be reproduced on the screen of the color picture tube.

It may be added that the NTSC signal substantially comprises, in addition to the luminance and chrominance signal components, a synchronizing signal which constitutes a raster and a burst signal which is adapted to maintain a color synchronization.

One form of image reproducing device of the type discussed above conventionally includes a cathode-ray tube having three individual electron guns.. A more recent type of the picture tube is the Lawrence tube utilizing a single electron gun for effecting reproduction of the three primary color images.

The video-frequency signal according to the NTSC system comprises successively and simultaneously the luminance and chrominance signals. Therefore, the two simultaneous signals are subjected to proper sampling thereby to translate them into dot sequences or line sequences, as the case may be. This color conversion is carried out by the signal-electron gun type tube in which the color switching signal voltages are applied to the line grids, i.e., the color grids of the tube so that the electron beam emitted from the gun will be switched in the sequence: red, green, blue, green, red, green . . . while the individual color components are applied to the gun in the same sequence and in synchronism therewith.

The fluorescent screen of such single-gun tube is typically made up of very narrow strips of color phosphors arranged vertically in the sequence: red, green, blue, green, red, green . . . and further comprises control grids accurately aligned inside of and opposite the color strips. To the control grid structure is applied a color switching signal for causing the selection of color components to be reproduced on the screen. Thus, a single electron beam directed toward the grid can be made to strike a red, green or blue phosphor strip as desired by controlling the voltage difference between the two sets of grids. If no voltage difference exist between the grids, all incoming electrons are deflected so that they hit green strips irrespective of their initial position. Applying a voltage of certain polarity between the two sets of conrtol grids will result in the deflection of the beam toward red or blue strips. It follows that the televised color image can be reproduced by applying the color switching signal across a transformer to the control grid structure. The principles of directing the beam toward the different phosphor strips, just described in relation to the generation of green color, may equally be applied in relation to red or blue color in which case the color switching signal is applied in the sequences: B, R, G, R, B . . . or R, B, G, B, R, B . . . .

In reproducing the color image utilizing a picture tube of the type having a single electron gun such as that known as Lawrence tube, the so-called dot-sequential system has hitherto been employed. This dot-sequential reproducing system is characterized by application of a sinusoidal wave voltage of a color subcarrier frequency (3.58 megacycles) to the color control grids thereby to cause the beam to deflect and strike the different phosphor strips.

The above-mentioned dot-sequential reproducing system utilizing such sinusoidal voltage is encountered with certain difficulties. It requires the electron beam to be switched extremely instantaneously from one phosphor strip group to another, and should this be accomplished, the continuously emitted beam is caused by the sine wave voltage applied to the color control grids to scan the screen intermediate between one group of phosphor strips and another at each horizontal scanning period, with the result that the color images fail to appear at predetermined spots on the screen and the proportions of individual hues are disturbed which necessitates the blanking of color at certain spots on the screen. To eliminate these difficulties, it becomes necessary to switch the electron beam exactly at such limited instance at once and to maintain an intermittent emission thereof thereby to permit the different phosphor strips to emanate their respective ones of the three primary colors in a dot sequence. The term "dot sequential system" is in effect derived from this approach.

In order to satisfy the above-described approach, it will be further necessary to apply to the cathode, first control grid or second control grid of the picture tube a gate signal of the type having the same frequency as and such phase relation to the color subcarrier as to permit the discontinuation of the electron beam at predetermined time points or a gate signal of the type having a frequency three times that of the subcarrier and such phase relation thereto as to permit the discontinuation of the beam at predetermined time points, said gate signal being detected either before or after application to the picture tube.

To discontinue the emission of the electron beam in the manner described will result in reduced utilization of the beam, hence reduced brightness of the image reproduced on the screen. Furthermore, the use of such sinusoidal wave of the subcarrier frequency for switching the color control grids tends to increase the power for the color switching signal which in turn develops objectionbale radiations to interfere with other communications equipment or color television receivers near at hand. And, furthermore, such approach necessarily makes the color image reproducing system more complicated with additional two or three color-demodulation circuits and gate circuits.

Whereas, it is an important object of the present invention to provide a novel, improved image reproduction system for a color television receiver having a single-electron gun type of picture tube, in which the various difficulties involved in the conventional systems utilizing the NTSC signal are substantially eliminated.

It is another object of the present invention to provide an improved color television signal reproducing system in which a stepped-waveform voltage having a frequency of one-third of a horizontal scanning frequency is utilized as a color switching signal in lieu of a sinusoidal waveform voltage having a color subcarrier frequency and in which a high rate of brightness and resolution of a color image may be obtained.

It is a further object of the present invention to provide an improved image reproducing system utilizing the NTSC signal and including a relatively compact, stabilized circuit arrangement incorporating a single color demodulation circuit for deriving a line-sequential color-difference signal.

It is a still further object of the present invention to provide a new and improved phase modulation circuit for a color television receiver.

The image reproducing system according to the present invention includes a single-gun type of picture tube such as known as Lawrence tube or a post-acceleration color picture tube including a single-electron gun and a color control grid structure. Similarly operable cathode-ray tube types of image reproducing apparatus other than those just mentioned may also be used.

The fluorescent screen of the above-mentioned type of cathode-ray tube consists of a number of very narrow strips of color phosphors, each strip being adapted to emanate one of the three primary colors, red, green and blue, and all strips being of either of these three colors, and these different phosphor strips are regularly aligned and coated on the face of the image screen. Immediately in front of the fluorescent screen is a grid structure consisting of electrically conductive wires accurately aligned in parallel with the phosphor strips, such wires being insulated from adjoining wire but electrically connected with every other piece of wire so that two sets of grid members are formed. These two sets of grid members are hereinafter referred to as color control grids and are adapted in the presence of a certain potential therebetween to cause the electron beam to deflect selectively so that the beam will strike one or the other group of phosphor strips.

The electron beam emitted from the electron gun is deflected vertically and horizontally by the influence of magnetic or electric fields before the beam arrives at the color control grids thereby developing a raster to be reproduced with its brightness controlled by the voltage between the cathode of the gun and the first grid, as this is the case with a conventional monochrome picture tube.

In accordance with the present invention, an image reproducing system for a color television receiver includes a cathode-ray tube of the type having a single-electron gun known as Lawrence tube or a single-electron gun type of post-acceleration color tube having a color switching grid structure, and comprises means for receiving a radio-frequency signal and deriving therefrom a composite video signal comprising a chrominance component, a luminance component, a color burst signal and a synchronizing signal, means for applying the luminance signal to the cathode of the cathode-ray tube and deriving the synchronizing signal from said composite video signal or output of said means thereby to develop a raster on the image screen of the cathode-ray tube, a color synchronizing circuit for deriving the color burst signal from the composite video signal thereby to provide a reference signal for demodulation of a color-difference signal, said reference signal having the same frequency as a color subcarrier and a predetermined phase with respect to the burst signal, a voltage generator for generating a voltage having a frequency of one-third of a horizontal scanning frequency for the raster and having a three-stepped waveform, said three-stepped waveform voltage being supplied to the color switching grid in the cathode-ray tube, a phase modulation circuit for phase-modulating the reference signal from the synchronizing circuit with the three-stepped waveform, means for deriving the chrominance signal component from the composite video signal and means for deriving the color-difference signal by demodulating the chrominance signal with the output of the phase-modulation circuit, said color-difference signal being applied to the first grid of the cathode-ray tube.

The color image reproducing system in accordance with the present invention is characterized by the utilization of a voltage having three steps in its waveform, hereinafter referred to as a three-stepped waveform voltage and hereinafter more fully identified, and having a frequency of one-third of, or a cycle corresponding to three cycles of the horizontal scanning frequency for excitation of the line grid or color switching or control grid of the cathode-ray tube. The three-stepped waveform voltage is also utilized to phase-modulate the reference signal (or crystal oscillator output) which is in turn utilized to demodulate the chrominance signal thereby to develop a color-difference signal in a line sequence.

In the above arrangement, substantially similar results may be obtained by applying the luminance signal to the first grid and the color-difference signal to the cathode of the picture tube.

A circuit concept considered preferable in accordance with the present invention for the generation of the stepped-waveform voltage comprises a ring counter circuit adapted to operate with the horizontal oscillation output or horizontal deflection output signal derived from the raster developing means and a waveform shaper circuit adapted to produce a three-stepped waveform by superimposing the outputs from the ring counter. The circuit concept further comprises a sequential wave transformer having an intermediate tap at the secondary winding in the phase-modulation circuit and a circuit means consisting of a condenser and a coil and being coupled between the ends of the secondary winding of the transformer, said circuit means having its reactance varying with the three-stepped waveform voltage. With this arrangement, the desired phase-modulated output may be derived from a closed-circuit formed between the intermediate tap and the secondary winding as the reference signal or the output of the color synchronizing circuit is applied to the primary winding of the transformer.

Another preferred embodiment considered for the generation of the three-stepped waveform voltage according to the present invention comprises forming two different sawtooth waves, one of which being obtained by integrating a pulse derived from the horizontal oscillation or horizontal deflection output circuit in the raster developing unit and the other sawtooth wave being obtained by integrating a pulse having a cycle corresponding to three cycles of a horizontal scanning derived from a blocking oscillator synchronizing with the output of the horizontal deflection circuit at one-third of a horizontal scanning frequency, the resulting two different sawtooth waves being combined in a matrix circuit or a stepped-waveform shaper thereby to produce a voltage having three steps in its waveform as desired.

For a better understanding of the present invention as to its construction and operation, together with other and further objects thereof, reference is had to the following detailed description of the invention taken in connection with the accompanying drawings, and its scope will be pointed out in the appended claims.

In the drawings:

FIG. 3 is a schematic diagram illustrating a means for producing a voltage having three steps in its waveform according to the present invention;

FIGS. *4a–4d*, inclusive, are schematic diagrams illustrating input and output signal waveforms in part of ring counter circuits;

FIGS. *5a–5c*, inclusive, are schematic diagrams explaining the manner in which pulses are combined to form a stepped-waveform for application to a color control grid;

FIG. 6 schematically illustrates an example of color arrangements on scanning lines for forming a raster;

FIGS. 7*a* and 7*b* schematically illustrate waveforms utilized to phase-modulate the output of a crystal oscillator;

FIG. 8 schematically illustrates detection axes symmetrically shifted 120° apart in phase;

FIG. 9 schematically illustrates detection axes agreeing in phase with $R-Y$, $G-Y$ and $B-Y$, respectively, where Y denotes the luminance signal.

Figure 14:
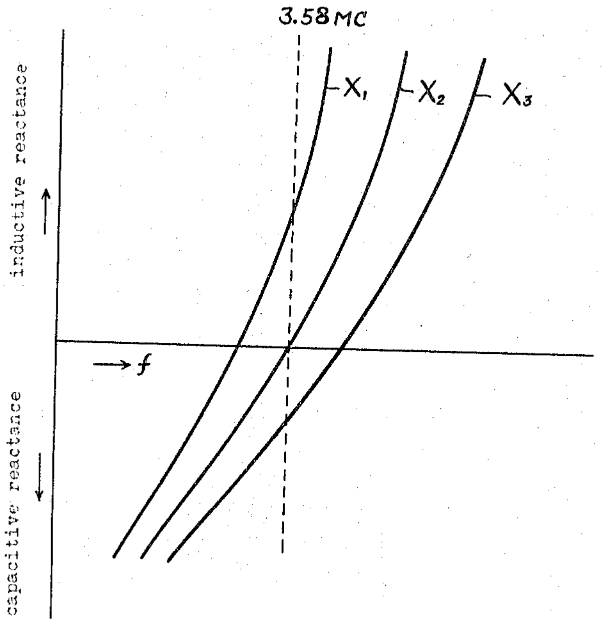
Figure 15:
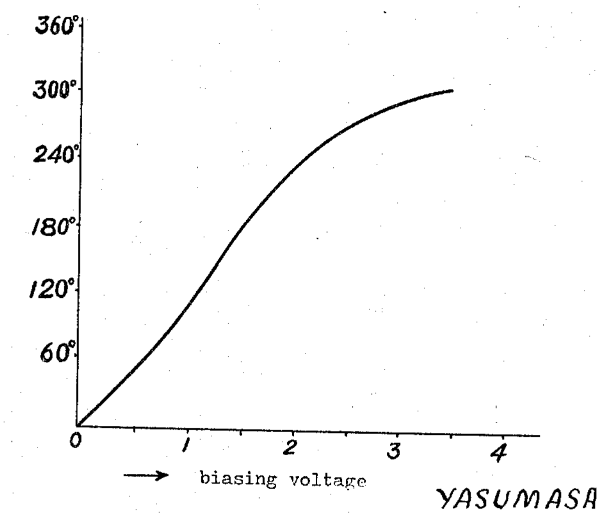

FIG. 10 is a schematic diagram explaining the operation of the phase-modulation circuit;

FIGS. 11*a*–11*c*, inclusive, are vector diagrams further explaining the operation of the phase-modulation circuit of FIG. 10;

FIG. 12 vectorially illustrates the range of phase-modulation;

FIG. 13 is a schematic diagram of a variable reactance circuit;

FIG. 14 graphically displays the reactance characteristic of the circuit of FIG. 13; and FIG. 15 shows a curve of the phase shift noted when changing the bias to a variable-capacity diode.

Figure 1:
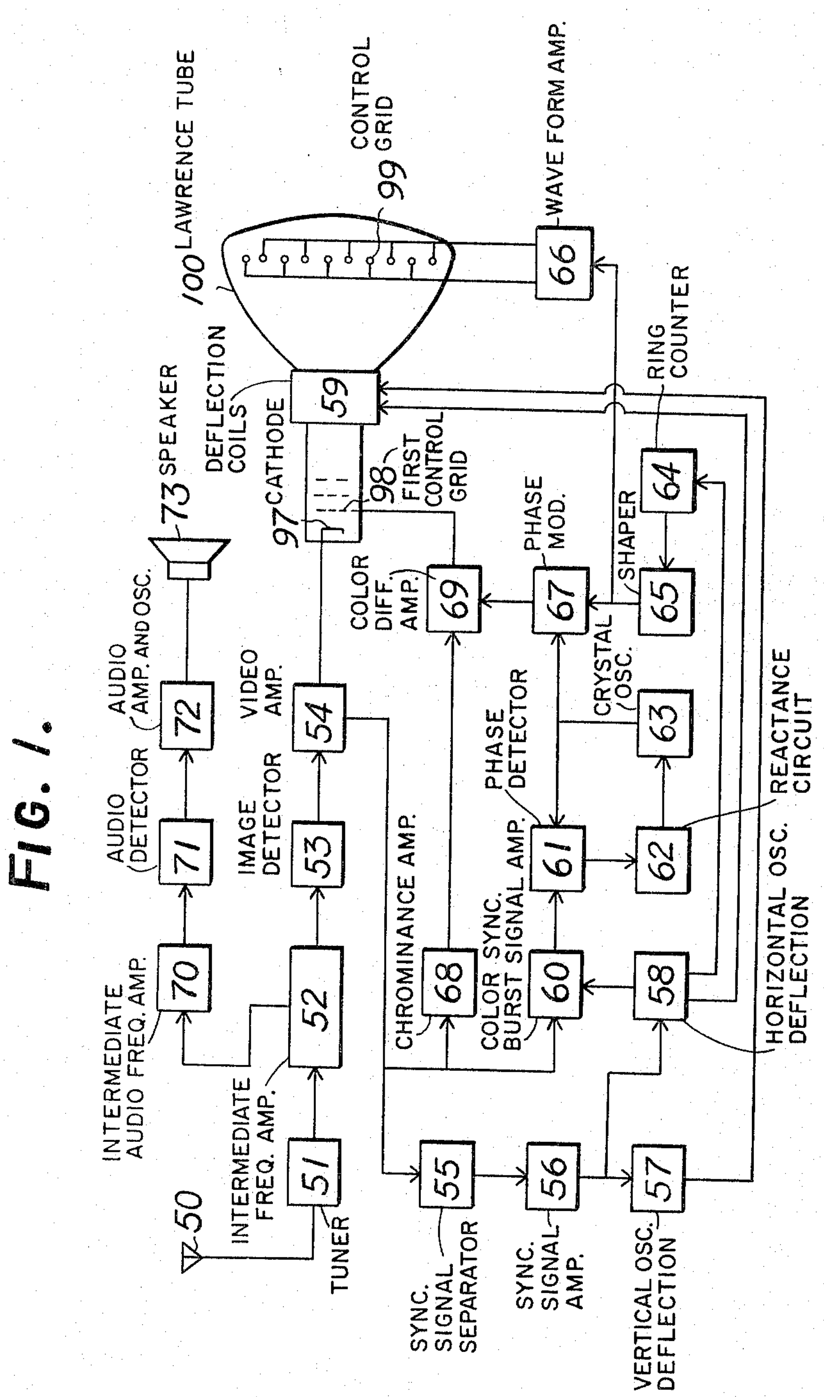
FIG. 1 is a schematic diagram illustrating a color television receiver including an image reproducing system according to the present invention.

Reference to FIG. 1 shows a Lawrence tube 100 including a single-electron gun 100, a color control grid structure 99, a first grid 98 and a cathode 97 thereof.

Designated at 50 through 54, inclusive, are circuit units adapted to derive from a radio-frequency signal a composite video signal comprising a chrominance signal, a luminance signal, a burst signal and a synchronizing signal; the reference numeral 50 represents a receiving antenna, 51 represents a tuner, 52 represents an intermediate frequency amplifier, 53 represents an image detector circuit and 54 represents a video amplifier circuit.

The reference numerals 55–58, inclusive, represent a unit adapted to derive the synchronizing signal from the composite video signal thereby to develop a raster on the image screen of the picture tube 100; where the numeral 55 represents a synchronizing signal separator, 56 represents a synchronizing signal amplifier, 57 represents a vertical oscillation and deflection output circuit and 58 represents a horizontal oscillation and deflection output circuit. Designated at 59 is a pair of deflection coils for vertical and horizontal components included in the picture tube 100.

The reference numerals 60–63, inclusive, represent a color synchronizing circuit adapted to derive the burst signal from the composite video signal and provide a reference signal (having the same frequency as a color subcarrier and a predetermined phase with respect to the burst) for modulation of the color-difference signal; the numeral 60 represents a burst signal amplifier, 61 represents a phase detector, 62 represents a reactance circuit and 63 represents a crystal oscillation circuit.

Designated at 64 is a ring counter circuit and at 65 is a stepped-waveform shaper circuit which form a circuit for generating a voltage having three steps in its waveform and a frequency of one-third of a horizontal scanning frequency, i.e., each of said three steps being in synchronism with each horizontal scanning period. Designated at 66 is an amplifier adapted to amplify the stepped-waveform voltage for application to the color control grid structure 99 in the picture tube 100.

A phase-modulator 67 is adapted to phase-modulate the reference signal from the synchronizing circuit with the three-stepped waveform generated by the above stepped-waveform voltage generator.

Designated at 68 is a band pass amplifier for deriving the chrominance signal component from the composite video signal. Designated at 69 is a demodulation and color-difference signal amplifier adapted to demodulate the derived chrominance signal with the output of the phase-modulator thereby to produce a color-difference signal.

To complete the identification of the reference numerals used in FIG. 1, the numeral 70 designates an audio intermediate frequency amplifier, 71 designates an audio detector, 72 designate an audio amplifier and output circuit and 73 designates a speaker.

A color television signal received by the antenna 50 is supplied to the tuner 51 which comprises an input circuit, a high frequency amplifier, a frequency converter and a local oscillator, in which a signal of certain frequency is selected of the received TM signal and subjected to frequency-conversion after amplification. The signal from the tuner 51 is amplified by the intermediate frequency amplifier 52 and supplied to the video detector circuit 53 wherein a composite video signal is derived from the intermediate frequency signal. The composite video signal or the output of the video detector 53 includes a brightness signal, a chrominance signal, a synchronizing signal and a color burst signal. It is then amplified by the video amplifier 54, and the brightness or luminance signal component Y of the composite signal is supplied to the cathode 97 of the picture tube 100.

The picture tube 100, as already described, is a single-electron gun type of Lawrence tube including a cathode 97 for emitting an electron beam, a first control grid 98, a second control grid and an anode. The electron beam emitted from the gun impinges upon the image reproducing screen to develop a color image to be seen through an external transparent glass panel. Since the picture tube 100 utilized in the image reproducing system according to the present invention is of conventional construction and design, the details of such tube being well known in the art require no further description.

The composite video signal or the output of the video amplifier 54 is supplied (but the luminance signal component alone) to the cathode 97 of the picture tube 100 and at the same time, to the synchronizing signal separator 55, to the band pass amplifier 68 and to the burst signal amplifier 60.

The synchronizing signal component derived from the composite video signal at the synchronizing signal separator 55 is amplified by the synchronizing signal amplifier 56 and supplied to the vertical oscillation and deflection output circuit 57 and to the horizontal deflection output circuit 58.

The oscillator in each of the vertical and horizontal deflection output circuits 57 and 58 acts in accordance with the synchronizing signal applied thereto so that there may be obtained a corresponding deflection output.

The vertical and horizontal deflection outputs are applied to a pair of vertical and horizontal deflection coils 59 in the picture tube 100, whereupon the interstices of magnetic fields across the coils vary with the deflection outputs so that the electron beam from the gun is caused to deflect vertically and horizontally in accordance with the magnetic field strength, hereby developing a raster.

It will be understood that the relations between the picture tube 100 and the composite video signal developing unit 50–54 and the raster developing unit 55–59 are substantially the same with a conventional black-and-white receiver.

The composite video signal supplied to the burst signal amplifier 60 is selected to leave the color burst signal alone which is after amplification phase-detected by the phase detector 61.

The phase detector 61 forms a loop with a reactance circuit 62 and a crystal oscillator 63, in which the phase-detected color burst signal is applied across the reactance circuit 62 to the crystal oscillator 63 to control the oscillation output thereof so as to derive from the oscillator 63 a reference signal having a frequency equal to that of a color subcarrier and a predetermined phase point with respect to the burst, said reference signal being of successive cycles (frequency of which: 3.58 megacycles).

These circuits ranging from the burst signal amplifier 60 to the crystal oscillator 63 are commonly known as a color synchronizing system for a color television receiver.

The composite video signal supplied to the band pass amplifier 68 is selected to leave there a chrominance signal component to be amplified and fed to the demodulator and color-difference signal amplifier 69.

A color television signal of the type known includes an audio signal which is derived from the intermediate frequency amplifier 52 and supplied across the audio detector 71, audio amplifier and output circuit 72 to the speaker 73. This audio circuit is identical with that in a monochrome receiver, and the details of such circuit being well known in the art require no further description herein.

The reference signal above described is now supplied to the phase-modulator circuit 67 wherein it is amplified and phase-modulated by a voltage having three steps in its waveform each step being coincidental with each horizontal scanning period of the electron beam, with the result that three reference signals may be sequentially obtained which differ in phase periodically. In other words, three reference signals are developed sequentially which differ in phase at every horizontal scanning period. The three reference signals correspond to red, green and blue components, respectively, and serve as axes for demodulation and detection of the red, green and blue color signals in the demodulation circuit.

The chrominance signal from the band pass amplifier 68 is introduced into the demodulation and color-difference signal amplifier 69 to which are sequentially supplied three reference signals. As a red reference signal is applied to the demodulator, a red color-difference signal $R-Y$ is selected for demodulation. With a green reference signal applied, a green color-difference signal $G-Y$ is demodulated and with a blue reference signal, a blue color-difference signal $B-Y$ is demodulated, where R, G and B denote red, green and blue color signals, respectively, while Y denotes the brightness signal.

The three primary color-difference signals thus demodulated sequentially in the order named are amplified by the color-difference signal amplifier and supplied to the first control grid 98 of the picture tube 100, wherein the electron gun is controlled by these sequential signals to emit the red, green and blue component beams in the order named. One of the three different color beams is allowed to continue for one period of the horizontal scanning and until corresponding horizontal scanning lines are switched, followed by the other of the sequential beams.

The three primary colors of the televised image may thus be reproduced sequentially by causing the electron beam in the single-gun type of picture tube 100 to periodically impinge upon the different phosphors on the image screen thereby to develop the different component colors of the reproduced image. To accomplish this, the voltage applied to the color control grid must be changed synchronously to cooperate with the impinging of the beam upon the red, green and blue phosphors, respectively, to develop the three primary colors of the image.

According to the present invention, the voltage to be applied to the color control grid 99 is such which has a waveform stepped at three different points as will be more fully discussed hereinafter, and which may be applied commonly for the emission of the three different primary colors in a single-gun type of picture tube.

The three-stepped waveform voltage, as is so conveniently termed, is supplied to the phase modulator 67 and after amplification through the color switching voltage amplifier 66, is supplied to the color control grid 99. Each step of the waveform of this voltage is so formed as to exactly coincide with each horizontal scanning period. Therefore, there will be no discrepancies encountered in the timing of the impinging electron beam upon each of the three different color phosphors as desired.

The present invention offers two different ways of providing the three-stepped waveform voltage for controlling the electron beam. One of which methods, as schematically illustrated in FIG. 1, contemplates the use of a ring counter circuit 64 and a stepped-waveform shaper circuit 65. The ring counter 64 is adapted to provide three synchronous square waves upon reception of the signal from the horizontal oscillation and deflection output circuit 58. The stepped-waveform shape 65 receives the three square waves in proper sequence from the ring counter 64 and combines them into a voltage having three steps in its composite waveform.

It may be readily understood from the above that the voltage thus obtained will synchronize with the horizontal scanning period and hence, the switching of the electron beam or the switching of the color control grids 99 can be made in coincidence with a horizontal scanning frequency so that the televised image is reproduced with well balanced hue.

The other method of forming a three-stepped waveform voltage, as illustrated in FIG. 3, contemplates the use of a blocking oscillator 74, integration circuits 75, 76 and a stepped-waveform shaper circuit 77. The oscillator 74 may be of a conventional type such as a multivibrator or a blocking oscillator, and is adapted to receive a horizontal pulse from the horizontal oscillation and deflection output circuit 58 and supply an oscillating output which synchronizes at one-third of a horizontal scanning frequency. The oscillating output is then supplied to the integration circuits 75 and 76 comprising combinations of condensers and resistors in which the pulse is transformed into a sawtooth wave. The reference character H in FIG. 3 is utilized to represent a complete cycle or period of a horizontal scanning, or a cycle of a pulse from the horizontal oscillation and deflection output circuit 58. The two sets of sawtooth waves from the integration circuit 75 and the integration circuit 76, respectively, are suitably combined at the stepped-waveform shaper 77 which is a usual matrix circuit consisting of a combination of resistors. The composite waveform signal output therefrom is substantially identical with the three-stepped waveform voltage obtained from the ring counter circuit 74 and the stepped-waveform shaper 65 according to the first method.

The waveforms resulting from the two methods above described are depicted, respectively, in FIG. 3. The details of circuit elements involved in each method being well known require no further explanation.

The image reproducing system according to the present invention has been discussed with reference to the block diagram of FIG. 1 and will now be more fully described in consideration of actual circuit arrangements which may be involved in the operation thereof.

Figure 2:
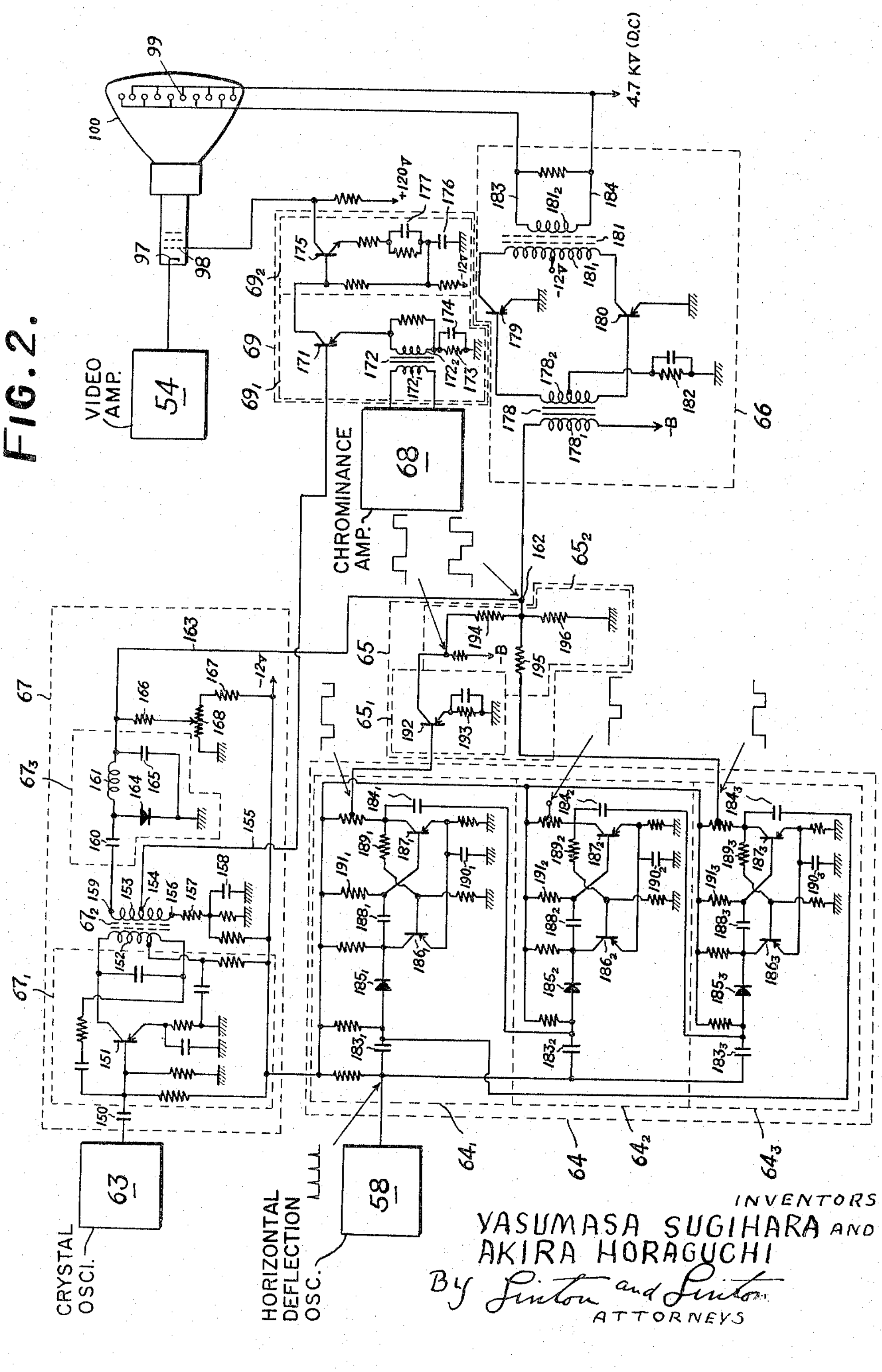
FIG. 2 is a circuit diagram, partially schematic, illustrating the principal electrical circuit units and elements utilized in the image reproducing system of the present invention.

The principal electrical circuit as diagrammatically shown in FIG. 2 includes a ring counter circuit 64, a stepped-waveform shaper circuit 65, a phase-modulation circuit 67, a demodulation and color-difference signal amplifier 69, a color control voltage amplifier 66 and a picture tube 100. Other circuit components are similar to corresponding parts in a color television receiver (or a dot-sequential system) operating with the NTSC signal and therefore, require no description herein.

The phase modulator 67 comprises a buffer circuit $67_1$ and has coupled thereto a continuous wave transformer $67_2$ and a variable reactance circuit $67_3$. The output of the crystal oscillator 63 (or a reference signal having a color subcarrier frequency of 3.58 megacycles) is introduced through a coupling condenser 150 into the buffer $67_1$ in which it is buffered and amplified by a transistor 151 for application to the primary winding 152 of the continuous wave transformer $67_2$. The buffer-amplifier $67_1$ similar to an ordinary amplifier is intended to prevent the signal effect in a subsequent circuit from coming back to a prior circuit, other than for the purpose of amplification.

The continuous wave transformer $67_2$ has provided centrally at the secondary winding 153 thereof with an intermediate tap 154 which is connected across a lead 155 to a demodulator circuit $69_1$ of the demodulation and color-difference signal amplifier 69. One end of the secondary winding 153 is connected across a suitable resistor 157 to a power −B and further connected across a condenser 158 to ground. The other end 159 of the secondary winding 153 is connected by a lead 163 across a condenser 160 and a coil 161 to the output end 162 of the stepped-waveform shaper circuit 65. The diode of variable capacity 164 is connected at one end thereof to a point between the condenser 160 and the coil 161 and at the other end thereof to ground. The opposite end of the coil 161 is connected across a condenser 165 to ground. Power −B is supplied to the lead 163 across the resistors 166, 167 and a variable resistor 168, these resistors being adapted to maintain proper potential of the circuit.

The secondary winding circuit of the continuous wave transformer $67_2$ is represented by an equivalent circuit in FIG. 10 wherein the reference character X denotes a variable reactance circuit $67_3$ including a capacitive reactance formed with a condenser 160 and a variable-capacity diode 164 and an inductive reactance provided by the coil 161, and the reference character R denotes a resistor 157 in the main. The condenser 165 therein is a high-frequency bypass condenser.

Before making a detailed account of the above circuit function, the operation of the equivalent circuit represented in FIG. 10 will be first discussed.

In the circuit of FIG. 10, when a voltage $e_1$ is induced in the secondary winding 153 of the transformer $67_2$ at one side $153_1$ across the intermediate tap 154, a similar voltage will be induced at the other side $153_2$ of the tap. Now, considering how the voltage $e_0$ varies between point 154 and point 170 according as the variable reactance X is changed, it will be seen that with the reactance X held at 0, the voltage $e_0$ remains equal to the voltage $e_1$ as shown in FIG. 11*a*.

As the variable reactance X changes to a certain inductive reactance, the induced voltage $e_0$ has a phase considerably behind that of the initial voltage $e_1$ as may be obvious from the vector representation in FIG. 11*b*. In which instance, the internal impedance of the power supply $e_1$ should be held sufficiently low as compared with the resistance R. Conversely, as the reactance X becomes capacitive, the induced voltage $e_0$ gains in phase with respect to the initial voltage $e_1$, as seen from the vector representation of FIG. 11*c*. It follows that the induced voltage $e_0$ may have a phase variation within the range of FIG. 12 indicated by the dotted line if the variable reactance X is automatically changed between capacitive and inductive with the value of each of the resistor R and the variable reactance X properly set.

Turning back to the variable reactance circuit $67_3$ as illustrated in FIG. 13, the variable condenser *c* is in reality a diode 164 having a capacity electrically variable with a bias voltage applied thereto. With the capacity of this condenser changing in three steps, the composite reactance in the circuit changes accordingly in three steps. It is also obvious that with a three-stepped waveform voltage applied to the diode 164, the composite reactance of the variable reactance circuit $67_3$ changes likewise in three steps.

Considering the above circuit concept in connection with the equivalent circuit of FIG. 10, the variation in the reactance with the three-stepped waveform voltage eventually equals to the reactance X and hence, the voltage between point 154 and point 170 remains constant in magnitude but changes in phase in three steps.

Turning further back to the electrical circuit arrangement of FIG. 2, it will be understood that the output ends of point 154 and point 170 in FIG. 10 correspond to lead 155 of the phase modulator 67 of FIG. 2 and ground, respectively, and therefore, there are made available from the phase modulator 67 three sequential signals (reference signals) which have their respective phase modulated by the three-stepped waveform voltage. The signal of 3.58 megacycles or the output of the crystal oscillator 63 remains constant in frequency either through the buffer $67_1$ or the continuous wave transformer $67_2$; hence, the output of the phase modulator 67 remains constant in frequency (3.58 mc.) and in magnitude.

Reference is here had to FIG. 15 which graphically displays the phase angles of the output voltage as plotted against the biasing voltage applied to the diode 164. From this curve, it will be appreciated that three individual signals different in phase may be obtained by determining the proper potential of the bias to the diode.

The modulation characteristic curve of FIG. 15 is subject to certain variations with the value reactance of each of the condensers 165, 160, coil 161 and diode 164 in the variable reactance circuit $67_3$ in the phase modulator 67.

By setting the circuit constant so as to provide an increase in the linear portion of the curve in FIG. 15, it is possible utilizing this linear curvature to provide three modulating signals (reference signals=detection axes for demodulation) or stepped-waveform voltages equal in step height as represented in FIG. 7*a*. The steps in the waveform of the signal voltage may be varied in height to agree with corresponding detection axes having different phase angles according to the NTSC system as illustrated in the vector diagram of FIG. 7*b*. Similar results may be obtained also by setting the variable reactance circuit constant so as to provide an increase in the bent portion of the curve.

The circuit illustrated in FIG. 2 represents the case where the voltage having three equally high steps in its waveform is used which is formed by utilizing the nonlinear portion of the modulation characteristic curve in FIG. 15.

The variable reactance circuit $67_3$ in the circuit of FIG. 2 has such a frequency-reactance characteristic as shown in FIG. 14 wherein the curve $X_1$ represents the case where a voltage corresponding to the top step of the three-stepped waveform is applied to the variable-capacity diode 164; the curve $X_2$ represents the case where a voltage corresponding to the middle step of the waveform is applied to the diode 164, and the curve $X_3$ represents the case where a voltage corresponding to the bottom step of the waveform is applied to the diode 164. The frequency at which the voltage is phase-modulated is constant at 3.58 megacycles; therefore, the reactance value of each of the curves $X_1$, $X_2$ and $X_3$ on the 3.58 mc. line in the graph of FIG. 14 corresponds to that of each of the three steps in the waveform of the control voltage. The reactance on the curve $X_1$ is inductive, that on the curve $X_2$ is zero, and that on the curve $X_3$ is capacitive, each of which determines the phase angle of the voltage thereby to provide a modulating output as vectorially illustrated in FIG. 9.

Now, the apparatus utilized for the generation of the stepped-waveform voltage according to the present invention will be described below to make the invention more specifically understood.

The demodulator circuit $69_1$ in the demodulation and color-difference signal amplifier circuit 69 to which the output of the phase modulator 67 is supplied through the lead 155, comprises a transistor 171 and a second band-pass transformer 172 as shown in FIG. 2. The demodulator $69_1$ is so arranged that the chrominance signal or the output of the band pass amplifier 68 is applied to the primary winding $172_1$ of the second band-pass transformer 172, while the signal from the secondary winding $172_2$ thereof is supplied to the emitter of the transistor 171 to the base of which is supplied the output of the phase modulator 67 and from the collector of which is obtained a demodulated output. The emitter of the transistor 171 is connected to ground across the secondary winding $172_2$ of the second band-pass transformer 172 and the bias resistor 173 connected in parallel with a bypass condenser 174. Accordingly, the ground side of the phase modulator 67 is connected across the bypass condenser 174 to the emitter of the transistor 171, and the secondary winding $172_2$ of the second band-pass transformer 172 is connected at one end thereof to ground.

Applying to the demodulator $69_1$ the chrominance signal from the band-pass amplifier 68 and simultaneously the modulating signal (reference signal=detection axis) from the phase modulator 67 develops a demodulated signal, namely, a color-difference signal between the collector of the transistor 171 and ground. The modulating signal, as already discussed in connection with FIG. 9, has three different phase points which serve as references for the demodulation of a red, a green and a blue component color. Sequential application of three signals different in phase to the demodulator $69_1$ results in the supply of a red color-difference signal $R-Y$, a green color-difference signal $G-Y$ and a blue color-difference signal $B-Y$ sequentially in the order named. The output (color-difference signal) of the demodulator $69_1$ is supplied to the color-difference signal amplifier $69_2$ which is of a known type comprising a transistor 175. This amplifier circuit is connected at one output terminal or the collector thereof to the base of the transistor 175 and at the other terminal or grounded side thereof to the emitter of the transistor 175 across the condensers 176 and 177. To the base, emitter and collector of the transistor 175 is applied a predetermined D.-C. voltage.

The output of the demodulator $69_1$ is thus amplified by the transistor 175 thereby to develop at the collector thereof a color-difference signal sufficiently amplified for application to the picture tube 100.

The resulting color-difference signal or the output of the color-difference signal amplifier $69_2$, namely, the output signal from the collector of the transistor 175 is then supplied to the first control grid 98 of the picture tube 100.

The color-difference signal thus applied to the picture tube 100 controls the electron beam which is being emitted from the cathode 97 in response to the luminance signal Y simultaneously applied thereto. In other words, the picture tube 100 acts substantially as a matrix circuit to develop the color-difference signal as combined with the luminance signal thereby effecting the emission of electron beams from the gun sequentially in correspondence with the three primary color-difference signals combined with the luminance or brightness signal Y.

The electron beam is deflected by the deflection coil 59 in both vertical and horizontal directions to develop a color image on the screen of the picture tube 100. Each of the component color beams is switched at every horizontal scanning period as this will be more fully described hereinafter.

In controlling the switching of the different component color beams impinging upon corresponding phosphor strips on the screen, it is necessary to make the switching of one component color beam in synchronism with the other component beams. To accomplish this in accordance with the present invention, a voltage having three steps in its waveform is applied to the color-switching signal amplifier 66 from the phase modulator 67 and after amplification, is supplied to the color control grid 99.

The color-switching signal amplifier 66 is an ordinary push-pull amplifier comprising a drive transformer 178, transistors 179, 180 and an output transformer 181. This amplifier circuit is adapted in a manner similar to the phase modulator 67 for deriving the three-stepped waveform voltage from the output terminal 162 of a stepped-waveform shaper circuit 65 which is described more fully hereinafter. The derived voltage is applied to the primary winding $178_1$ of the drive transformer 178. The secondary winding $178_2$ thereof is connected at one end to the base of the transistor 179 and at the other end to the base of the transistor 180, the emitters of these transistors being connected to ground and the collectors thereof being connected to the ends of the primary winding $181_1$ of the transformer 181. The intermediate tap centrally positioned on the transformer 178 is connected across a bias circuit 182 to ground, and is adapted to receive a voltage −B. The secondary winding $181_2$ of the color-switching signal output transformer 181 is connected across leads 183, 184 to two sets of line grids constituting the color control grid structure 99. To one end of the secondary winding $181_2$ is supplied a D.-C. high voltage.

With this circuit construction, the three-stepped waveform voltage is applied across the primary winding $178_1$ of the color-switching drive transformer 178 to the transistors 179, 180 and further across the color-switching signal transformer 181 to the color control grids 99.

Applying one of the three-stepped waveform voltages commonly to the phase modulator 67 and the color control signal amplifier 66 develops a corresponding color-difference signal representative of one of the three primary colors at the demodulation and color-difference amplifier 69, and a corresponding color component beam is emitted synchronously therewith from the electron gun so that the beam strikes a corresponding one of the different phosphor strips.

Apparatus utilized in the generation of the three-stepped waveform voltage according to the present invention will be fully described below which constitutes an important part of the inventive concept of the present invention.

The apparatus shown in FIG. 2 substantially comprises a ring counter circuit 64 and a stepped-waveform shaper 65. The ring counter circuit 64 is of the type well known in the art which consists of three one-shot multivibrators $64_1$, $64_2$ and $64_3$.

These multivibrators are adapted to receive a trigger pulse from the horizontal oscillation and deflection output circuit 58 across condensers $183_1$, $183_2$ and $183_3$. A ring-coupling of each of the multivibrators is formed with each of the differentiation circuits or condensers $184_1$, $184_2$ and $184_3$.

The multivibrators $64_1$, $64_2$ and $64_3$ are provided with diodes $185_1$, $185_2$ and $185_3$, respectively, and further with pairs of transistors $186_1$, $187_1$, $186_2$, $187_2$ and $186_3$, $187_3$, respectively. The trigger pulse from the horizontal oscillation and deflection output circuit 58 is applied across the diodes $185_1$, $185_2$ and $185_3$ to the collector of each of the transistors $186_1$, $186_2$ and simultaneously across the condensers $188_1$, $188_2$ and $188_3$ to the base of each of the transistors $187_1$, $187_2$ and $187_3$. The base of each of the transistors $186_1$, $186_2$ and $186_3$ is coupled across each of the resistors $189_1$, $189_2$ and $189_3$ to the collector of each of the transistors $187_1$, $187_2$ and $187_3$, while the emitters of both stages of transistors are coupled together and connected across the condensers $190_1$, $190_2$ and $190_3$ to ground. Resistors $191_1$, $191_2$ and $191_3$ are inserted between the bases of the transistors $187_{1-3}$ and the condensers $188_{1-3}$ for application of voltage −B therethrough to the circuit.

It will be appreciated that a suitable voltage is also supplied to the above circuit where necessary across a suitable bias resistor.

One set of transistors $186_{1-3}$ of the multivibrators are normally held in cut-off position while the other set of transistors $187_{1-3}$ are energized. With a positive pulse from the output circuit 11 applied to the input of one of the multivibrators $64_1$, the pulse is led through the condenser $183_1$, the diode $185_1$ and the condenser $188_1$ to the base of the transistor $187_1$ thereby to terminate the energization of the transistor $187_1$. At which time, the collector of the transistor $187_1$ is held in negative potential which in turn causes the base of the transistor $186_1$ to become negative in potential and energized. Upon energization of this transistor, the condenser $188_1$ begins to charge across the resistor $191_1$ and the other transistor $187_1$ has its base potential descending progressively from positive to negative until it reaches the zero potential, when the transistor $187_1$ reverts to an energized state and the other transistor $186_1$ is cut off.

The time constant of each of the condenser $188_1$ and the resistor $191_1$ is so selected as to coincide with one horizontal scanning cycle.

It follows that the duration in which the transistor $186_1$ is in operation corresponds to a time interval between one and the next trigger pulse. This applies also to the other multivibrators $64_2$ and $64_3$. Each multivibrator generates upon reception of a pulse a square wave from the collector of each of the transistors $187_{1-3}$.

The output of each of the multivibrators $64_{1-3}$ which are coupled in a ring-form across the differentiation circuits or condensers $184_{1-3}$ has a square waveform, the rise portion of which corresponds to a positive pulse and the fall portion corresponds to a negative pulse, and is thus supplied as positive and negative pulses to the subsequent stage of multivibrators. Since the input of each multivibrator is a combination of multivibrator output and a positive trigger pulse, the sum of a positive output pulse from the multivibrator and a positive trigger pulse is a relatively large pulse and the sum of a negative output pulse and a positive trigger pulse is a relatively small pulse or nearly zero (this pulse being predetermined to be small enough to permit accurate performance of the circuit). Accordingly, the subsequent stage of multivibrators begins operation simultaneously as the preceding stage has completed the generation of square wave. In this manner, the multivibrators are switched to operation successively in turn but one trigger pulse cycle behind. Therefore, each multivibrator output turns into a square wave which has a phase one trigger pulse period or one horizontal scanning cycle apart from that of an adjoining multivibrator.

In the ring counter circuit 64 having three multivibrators coupled in a ring-fashion as illustrated in FIG. 2, one of which multivibrators receives a trigger pulse of the waveform shown at FIG. 4*a* thereby to develop a square wave of the waveform shown at FIG. 4*b*, the next multivibrator develops a square waveform shown at FIG. 4*c* and the last multivibrator develops a square waveform shown at FIG. 4*d*, respectively. Two of these square waves are supplied to the stepped-waveform shaper circuit 65.

The stepped-waveform shaper circuit 65 comprises a phase inverter $65_1$ and a matrix circuit $65_2$. The phase inverter $65_1$ comprises a transistor 192 having its base adapted to receive a square wave from one of the multivibrators $64_1$ in the ring counter circuit 64, its emitter grounded across a bias resistor 193 and its collector adapted to receive a voltage −B. The matrix circuit $65_2$ comprises resistors 194–196 radially connected, one of which resistors 194 being coupled with the collector of the transistor 192, the next resistor 195 being adapted to receive the square wave from one of the multivibrators $64_3$ and the last resistor 196 being connected to ground.

Each of the resistors 194–196 is connected at its radial coupling end to the output terminal 162.

The square wave introduced to the phase inverter $65_1$ is phase-inverted by the transistor 192 to develop a waveform shown at FIG. 5*b* and is combined at the matrix circuit $65_2$ with another square wave of FIG. 4*d* or FIG. 5*a* derived from the multivibrator $64_3$, so that a voltage having three steps in its waveform shown at FIG. 5*c* is obtained from the output terminal 162.

The value of each resistor in the matrix circuit $65_2$ is so determined that the stepped-waveform voltage has resultant three steps equal in height as illustrated in FIG. 5*c*.

The three-stepped waveform voltage is, as already stated, supplied from the output terminal 162 to the phase modulator 67 and to the color-switching signal amplifier 66.

Since the three-stepped waveform voltage includes a positive trigger pulse component from the horizontal oscillation and deflection output circuit 58, each step of the waveform corresponds in duration with one trigger pulse and is switched at every trigger pulse. This voltage is applied to the phase modulator 67 and the modulated output thereof is supplied to the demodulation and color-difference signal amplifier 69 thereby developing the three primary color-difference signals, duration of each signal thereof being correspondent with one period of the horizontal scanning and being switched at every horizontal scanning period. The same stepped-waveform voltage is simultaneously applied to the color-switching signal amplifier 66 so that a voltage differing at each horizontal scanning period is applied to the color control grids 99 in synchronism with each color-difference signal.

Accordingly, the electron beam is switched to impinge upon one of the different phosphor strips to another at each horizontal scanning period.

One example of phosphor strip arrangements on the screen of the picture tube 100 according to the present invention is given in FIG. 6, wherein the reference characters R, G and B represent red, green and blue, respectively. In this example, the electron beam scans every other line in the manner shown at numerals 1, 2, 3, 4 . . . to complete a reproduced image.

Having thus described the present invention, it will be appreciated that the image-reproducing system according to the invention will eliminate the necessity of emitting the beam intermittently in a dot sequence as in the case of a color television receiver utilizing a single electron gun type of picture tube such as Lawrence tube operating on the principle of a dot-sequence system, require no gate signal to instantaneously terminate the emission of the electron beam such gate signal being responsible for objectionable radiation effects or interferences with other communications equipment or color television receivers near at hand and hence, provide an increase in the utilization of the electron beam to give a brighter picture on the screen.

The circuit according to the present invention does not require two or three color demodulation circuits as in the case of a dot-sequential television system but can accomplish the purpose with a single modulator for a line-sequential color-difference signal. This will in turn serve to make the circuit compact at once and stable in operation, and will further eliminate the irregular signal detection or aging of the circuit arising from the use of two or more demodulation circuits. It is not necessary according to the present invention to adjust the balance of white hue of the image.

While there have been described what are at present considered to be the preferred embodiments of this invention, it will be obvious to those skilled in the art that various changes and modifications may be made therein without departing from the invention, and it is therefore intended to cover all such changes and modifications as fall within the appended claims.

What is claimed is:

1. An image reproducing system for a color television receiver including a cathode-ray tube of the type having a single electron gun known as Lawrence tube or a similarly operative post-acceleration color tube having a color control grid structure, which comprises means for deriving from a radio-frequency signal a composite video signal comprising a chrominance component, a luminance component, a color burst signal and a synchronizing signal, means for applying the luminance signal to the cathode of the cathode-ray tube and deriving the synchronizing signal from said composite video signal thereby developing a raster on the image screen of the cathode-ray tube, a color synchronizing circuit for deriving the color burst signal from the composite video signal and providing therefrom a reference signal for demodulation of a color-difference signal, said reference signal having the same frequency as a color subcarrier and a predetermined phase with respect to the burst signal, a voltage generator responsive to the synchronizing signal for generating a voltage having a frequency of one-third of a horizontal scanning frequency and having a three-stepped waveform said three-stepped waveform being supplied to the color control grid in the cathode-ray tube, a phase modulation circuit responsive to said three-stepped waveform voltage for phase-modulating said reference signal, means for deriving the chrominance signal component from the composite video signal and means for deriving the color-difference signal by demodulating the chrominance signal with the output of the phase modulation circuit, said color-difference signal being applied to the first grid of the cathode-ray tube.

2. The image reproducing system as defined in claim 1 wherein the signal applied to the cathode of the cathode-ray tube is interchanged with the signal applied to the first grid thereof.

3. In an image reproducing system for a color television receiver including a cathode-ray tube of the type having a single electron gun such as known as Lawrence tube, the process comprising applying to the color control grid of the tube a voltage having three steps in its waveform and having a frequency of one-third of a horizontal scanning frequency or a cycle corresponding to three cycles thereof, phase-modulating with said three-stepped waveform voltage a reference signal having a color subcarrier frequency, and demodulating the chrominance signal with the resultant phase modulated reference signal thereby developing a line-sequential color difference signal for application to said tube.

4. The image reproducing system as defined in claim 1 wherein said voltage generator comprises a ring counter circuit operating with a horizontal oscillation or deflection output signal from a raster developing device and a stepped-waveform shaper circuit adapted to superimpose the output from said ring counter thereby developing a voltage having three steps in its waveform.

5. The image reproducing system as defined in claim 1 wherein said voltage generator comprises an integration circuit adapted to produce a synchronous sawtooth wave by integrating the pulse from a horizontal oscillation or deflection output circuit in the raster developing device, a blocking oscillator adapted to produce a pulse having a cycle corresponding to three horizontal scanning cycles, said pulse being applied to said integration circuit for developing another synchronous sawtooth wave, and a matrix circuit adapted to combine the two sawtooth waves thereby developing a voltage having three steps in its waveform.

6. The image reproducing system as defined in claim 1 wherein said phase modulation circuit comprises a continuous wave transformer having an intermediate tap at the secondary winding thereof and having coupled between the ends of the secondary winding a circuit comprising a condenser and a coil and having its reactance variable with the three-stepped waveform voltage applied thereto, the primary winding of said transformer being adapted to receive a reference signal, i.e., the output of the color synchronizing circuit thereby deriving the phase-modulated output from a closed circuit formed between the intermediate tap and the ends of the secondary winding.

7. The image reproducing system as defined in claim 6 wherein said variable reactance circuit is formed with a condenser, a coil and a variable-capacity diode.

References Cited by the Examiner

UNITED STATES PATENTS

| | | | |
|---|---|---|---|
| 2,921,118 | 1/1960 | Benjamin | 178—5.4 |
| 2,965,704 | 12/1960 | Schagen | 178—5.4 |
| 3,035,116 | 5/1962 | Raibourn | 178—5.4 |

ROBERT L. GRIFFIN, *Primary Examiner.*

J. A. O'BRIEN, *Assistant Examiner.*